(12) United States Patent
Taghaddos

(10) Patent No.: US 6,375,251 B1
(45) Date of Patent: Apr. 23, 2002

(54) ENERGY-ABSORBING STRUCTURE FOR AN AUTOMOBILE

(76) Inventor: Hamid Taghaddos, Al Borj Medical Centre, P.O. Box 23719, Dubai (AE)

( * ) Notice: Subject to any disclaimer, the term of this patent is extended or adjusted under 35 U.S.C. 154(b) by 0 days.

(21) Appl. No.: 09/740,745

(22) Filed: Dec. 20, 2000

(51) Int. Cl.[7] .................................................. B60J 7/00
(52) U.S. Cl. ...................................... 296/189; 296/191
(58) Field of Search ................................. 296/189, 191

(56) References Cited

U.S. PATENT DOCUMENTS

| | | | | |
|---|---|---|---|---|
| 3,689,054 A | * | 9/1972 | Gouirand ...................... 267/68 |
| 3,695,665 A | * | 10/1972 | Matsuura ...................... 293/70 |
| 3,837,695 A | * | 9/1974 | Haase et al. .................. 293/71 |
| 3,971,583 A | * | 7/1976 | Kornhauser ................... 293/71 |
| 5,042,395 A | * | 8/1991 | Wackerle et al. ............ 296/191 |
| 5,106,137 A | * | 4/1992 | Curtis ......................... 293/107 |
| 5,646,613 A | * | 7/1997 | Cho ............................ 180/167 |
| 5,720,510 A | * | 2/1998 | Daniel et al. ................ 296/188 |
| 5,732,785 A | * | 3/1998 | Ran et al. .................... 180/271 |
| 5,992,794 A | * | 11/1999 | Rotman et al. ............. 244/17.17 |
| 5,997,077 A | * | 12/1999 | Siebels et al. ............... 296/189 |

FOREIGN PATENT DOCUMENTS

| DE | 39 160 65 | * | 11/1990 |
| FR | 2 621 677 | * | 10/1987 |
| JP | 2-208175 | * | 8/1990 |

* cited by examiner

*Primary Examiner*—Ken Patel
(74) *Attorney, Agent, or Firm*—William Nitkin

(57) ABSTRACT

An improved structure for a motor vehicle and method of construction comprising surrounding the outer portion of a motor vehicle with an outer shell, an inner shell disposed away from the outer shell and a plurality of airbag-like structures positioned between the inner shell and outer shell to provide a resilient, impact-resistant portion of the motor vehicle.

3 Claims, 3 Drawing Sheets

FIG. I

ENERGY-ABSORBING STRUCTURE FOR AN AUTOMOBILE

BACKGROUND OF THE INVENTION

1. Field of the Invention

The structure and method of this invention reside in the area of impact absorption in motor vehicles and more particularly relate to a system of structural members to form the exterior outer structure of a motor vehicle, such structural members having a plurality of inflated bags positioned between an outer shell and an inner shell which structural members help the vehicle absorb impact energy thereagainst in an accident.

2. History of the Prior Art

In the prior art the use of inflatable airbags which inflate upon vehicle impact within the passenger compartment of a vehicle is well known. These inflatable airbags help protect the occupants of the vehicle from injury. The use of air within chambers within the bumper of a vehicle is taught in U.S. Pat. No. 3,695,665 to Matsuura and U.S. Pat. No. 3,689,054 to Gouirand. A system of deploying a plurality of airbags around the exterior of a vehicle, which airbags, upon the detection of a collision, inflate outside the vehicle to protect the vehicle from damage such as taught in U.S. Pat. No. 5,646,613 to Cho and U.S. Pat. No. 5,732,785 to Ran et al.

SUMMARY OF THE INVENTION

It is an object of this invention to provide further protection beyond that provided by airbags of the prior art which tend to be positioned on the exterior of the vehicle or within the interior of the passenger compartment for protection of the vehicle or its occupants.

It is the goal of the present invention to provide an improved system of construction of a motor vehicle to include structural members containing a plurality of airbags. It is to this end that the vehicle construction is arranged wherein the chassis of the motor vehicle, being those parts that are supported on its suspension, and its motor, seats and other internal components are surrounded with the structural members of this invention comprised of an outer shell member, a plurality of airbags disposed therebehind, and an inner shell member such that the airbags are disposed between the outer shell member and the inner shell member with the fenders, and the front, sides and rear portions of the vehicle, as described below, forming a structure conforming to the general configuration of an outer shell, with airbags and then an inner shell confining the airbags between the outer shell and the inner shell. It is envisioned that these structural members will replace conventional motor vehicle outer framework to provide a highly resilient vehicle that is resistant to damage in accidents and will further protect and safeguard the occupants from injury in the event of a collision because of the highly resilient nature of the structural members of this invention incorporated in the structure of a motor vehicle.

DESCRIPTION OF THE PREFERRED EMBODIMENT(S)

Figure 1:
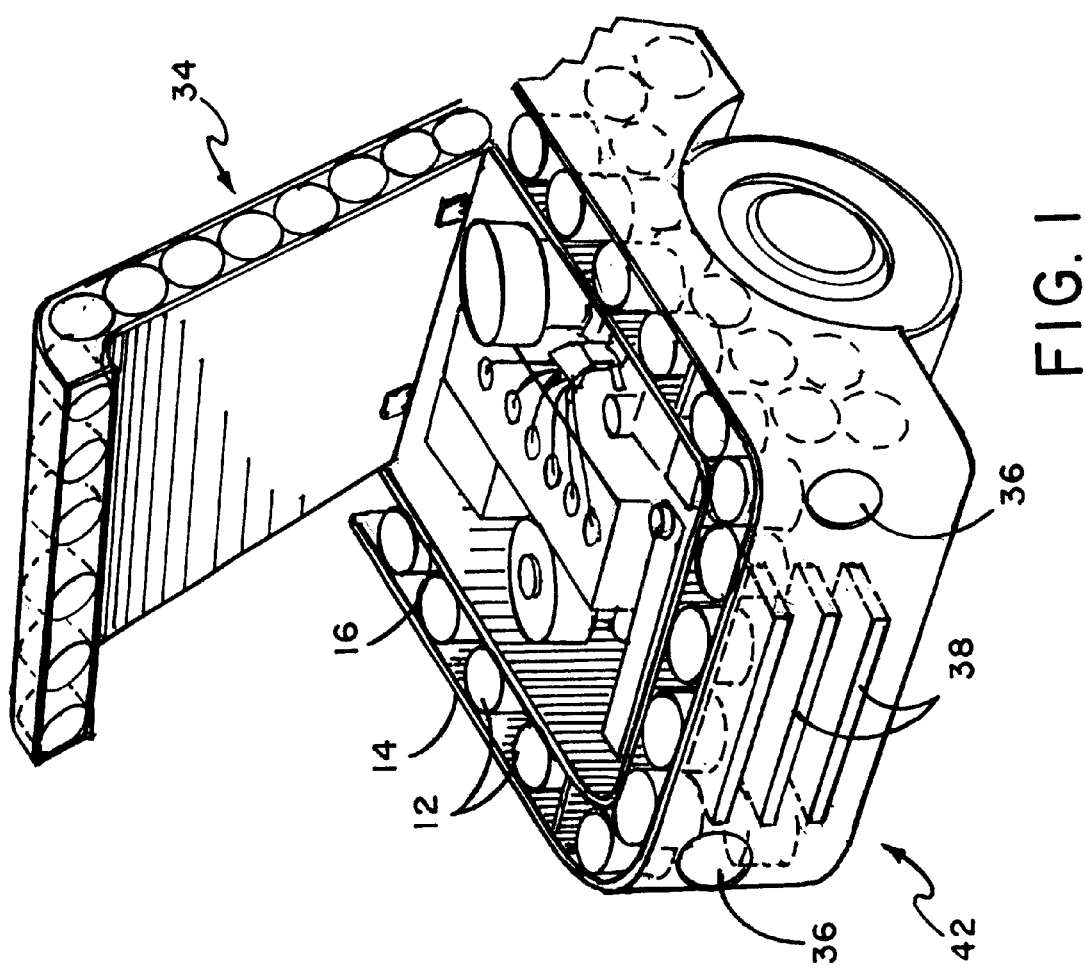
FIG. 1 illustrates a perspective view of the front portion of a motor vehicle incorporating the structural members of this invention in its construction.
Figure 2:
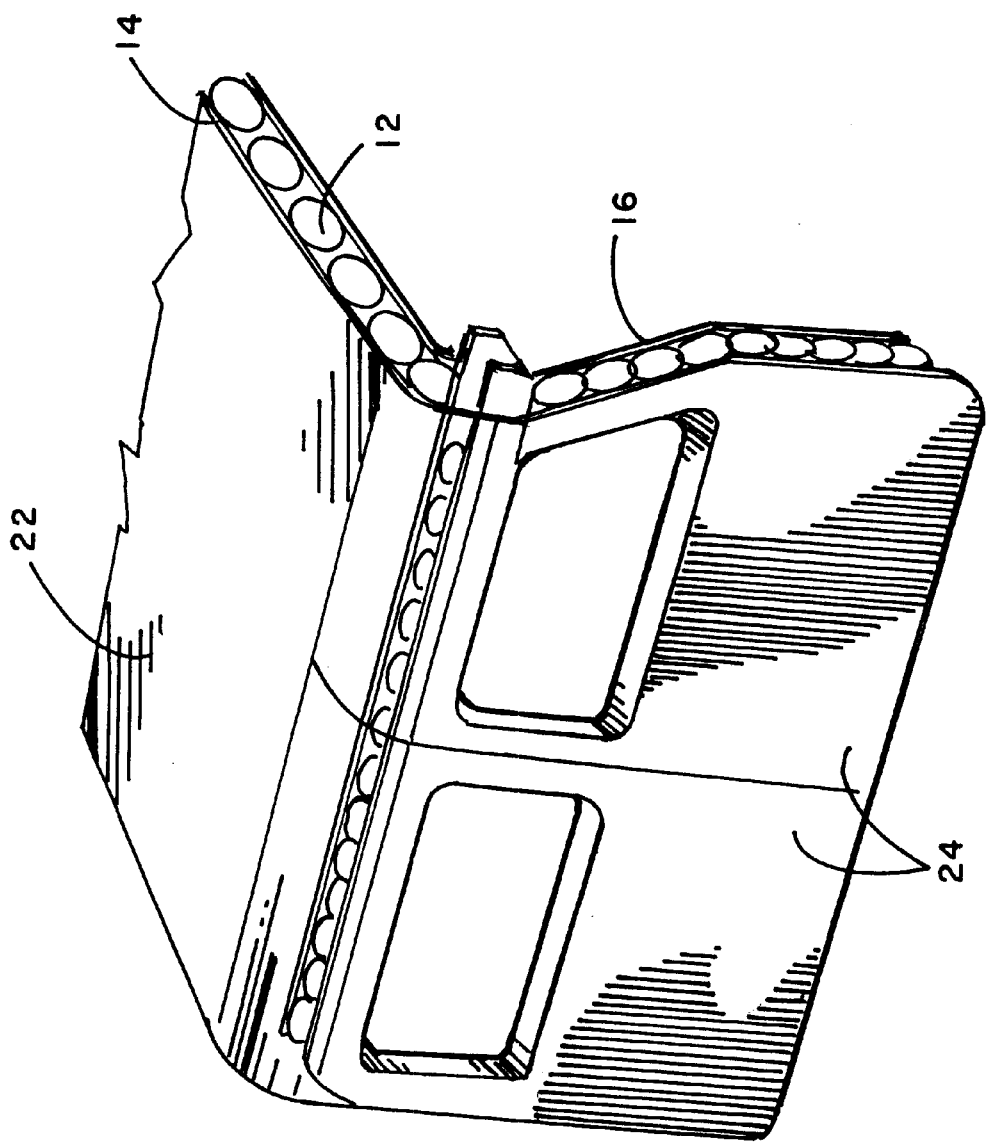
FIG. 2 illustrates a perspective view of a section of the middle portion of a motor vehicle to illustrate the utilization of the structural members of this invention therein.
Figure 3:
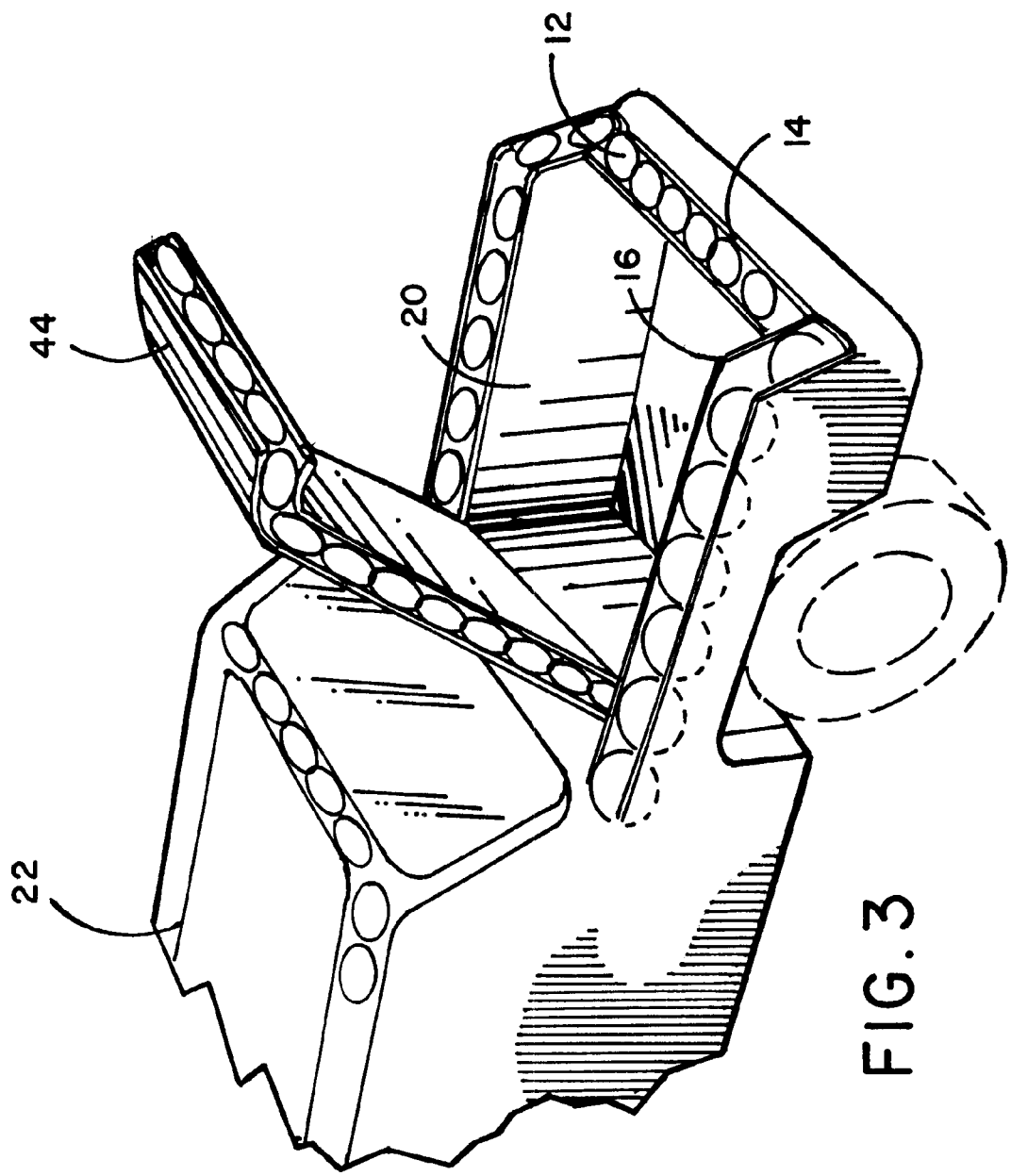
FIG. 3 illustrates a rear perspective view of a section of the motor vehicle showing its construction incorporating the structural members of this invention in the shell of the motor vehicle.

FIG. 1 illustrates a perspective view of the front of a motor vehicle incorporating the structural members of this invention. Seen in this view are the motor compartment and wheels, and it is to be understood that traditional suspension can be used to retain the wheels to the chassis. A radiator is shown in the front of the motor, but what is different about the vehicle illustrated is that the traditional framework and fenders of modem motor vehicles is not utilized. Instead, an outer shell, such as outer shell 14, is provided in the general area where the traditional fenders and grill would be utilized. Behind this outer shell is disposed a plurality of airbags 12 and behind the airbags is disposed an inner shell 16. Outer shell 14 and inner shell 16 are disposed apart from one another a distance sufficient to retain the airbags therein which airbags can be stacked in a general planar arrangement such that they are not disposed having a multiple airbag depth but are positioned so that they can be utilized for impact absorption. The outer shell and inner shell can be made from a variety of materials including molded plastic, thick rubber or thin metal such as aluminum, or combinations of these materials. For example, outer shell 14 can be made of a thin aluminum sheet and inner shell 16 can be made of a thicker layer of rubber material. Airbags 12 can be made of any convenient material such as a rubber-like material. They can be inflated to hold air or a foam-like material. It should be noted that these airbags are permanently inflated and remain in position between the outer and inner shells to form a very lightweight structural member which is very resilient and resistant to compression so that any impact on the exterior of the motor vehicle will compress the airbags and the impact will be thus absorbed by the airbags' compression. The impact will not easily damage the interior of the vehicle or the passenger compartment, thus protecting the passengers from injury. The structural members of this invention can be provided in segments. When utilized as a segment in the front of the vehicle, the structural member can have various apertures, such as aperture 36, for placement of the headlights and air intake apertures 38 for air to pass therethrough to reach the vehicle's radiator for cooling. Hood 34 of the vehicle can also be a segment of a similar structural member incorporating an outer layer and an inner layer with a plurality of airbags therebetween. It should be noted that such structural member of this invention can be utilized all around the exterior portions of the vehicle, such as seen in FIG. 2 where it is incorporated in segments forming the doors 24 and roof 22 of the vehicle and, as seen in FIG. 3, where a segment of the structural member is incorporated within trunk 44 and another segment, around trunk area 20 so that the trunk area can also have the same type of protection as the front and sides of the vehicle so as to provide a very resilient protection to the vehicle. It is to be understood that the shape of the outer shell need not be as plain as illustrated in the drawings herein and that decorative molding and design can be incorporated into the outer shell by stylists of vehicles. It is further to be understood that the airbags, although illustrated herein in a round shape, can take many shapes, and the airbags can be filled not only with air but with resilient foam material, such as a variety of plastic foams that will still retain their resiliency and resistance against compression over time and which will not be affected by temperature.

Although the present invention has been described with reference to particular embodiments, it will be apparent to those skilled in the art that variations and modifications can be substituted therefor without departing from the principles and spirit of the invention.

I claim:

1. An improved body for a motor vehicle, said motor vehicle of the type having a chassis and a body thereover, comprising:

an outer shell surrounding said chassis;

an inner shell disposed a distance inward of said outer shell; and a plurality of resilient, airbag-like members disposed between said outer shell and said inner shell, said combination of said outer shell, inner shell and plurality of airbags forming said body of said motor vehicle.

2. The structure of claim 1 wherein said combination of said outer shell, inner shell and plurality of airbags forms a substantially unitary member disposed in segments around the chassis of said motor vehicle, said plurality of airbags being retained between said outer shell and said inner shell, said unitary member forming said body of said motor vehicle.

3. A method for improving the structural integrity of a motor vehicle body, said motor vehicle body of the type having a chassis and a body thereover, comprising the steps of:

providing an outer shell surrounding said chassis and an inner shell disposed inward of said outer shell, said outer shell separated a distance from said inner shell;

disposing a plurality of airbag-like members between said inner shell and said outer shell, said combination of said outer shell, inner shell and plurality of airbags forming a structural member; and providing said structural member in a plurality of segments around said chassis to form said body of said motor vehicle.

* * * * *